United States Patent
Burns, Sr. et al.

(10) Patent No.: US 7,277,778 B2
(45) Date of Patent: Oct. 2, 2007

(54) CONTROL SYSTEM AND METHOD FOR CHEMICAL INJECTION

(75) Inventors: Patrick J. Burns, Sr., Dallas, TX (US); Jody D. Gilmore, Prosper, TX (US)

(73) Assignee: Burns Control Company, Dallas, TX (US)

( * ) Notice: Subject to any disclaimer, the term of this patent is extended or adjusted under 35 U.S.C. 154(b) by 448 days.

(21) Appl. No.: 10/924,391

(22) Filed: Aug. 24, 2004

(65) Prior Publication Data

US 2006/0047360 A1 Mar. 2, 2006

(51) Int. Cl.
*G06F 19/00* (2006.01)

(52) U.S. Cl. ............... 700/282; 700/241; 422/106

(58) Field of Classification Search ............ 700/236, 700/239, 241, 266, 282, 283; 239/67–69; 184/6.4, 6.28; 422/106

See application file for complete search history.

(56) References Cited

U.S. PATENT DOCUMENTS

| | | | |
|---|---|---|---|
| 5,137,694 A | * | 8/1992 | Copeland et al. ........... 422/106 |
| 5,583,764 A | | 12/1996 | Nail et al. |
| 5,612,890 A | * | 3/1997 | Strasser et al. ............. 700/241 |
| RE35,842 E | | 7/1998 | Ehlert |
| 5,921,350 A | | 7/1999 | Tsai |
| 6,101,427 A | * | 8/2000 | Yang ........................ 700/241 |
| 6,155,047 A | | 12/2000 | Streetman |
| 6,208,913 B1 | | 3/2001 | Marshall et al. |
| 6,428,694 B1 | | 8/2002 | Brown |
| 2002/0056592 A1 | | 5/2002 | Arens et al. |

* cited by examiner

*Primary Examiner*—Leo Picard
*Assistant Examiner*—Douglas S Lee
(74) *Attorney, Agent, or Firm*—John A. Thomas

(57) ABSTRACT

A chemical injection system has a pump and an actuator connected to the pump. The actuator further comprises a first sensor for sensing a deactivated state of the pump; a second sensor for sensing an activated state of the pump; a computer connected to the first and second sensors and the actuator; and an interface connected to the computer, to receive commands from, and to transmit data to, a control point. The computer further comprises a stored program. The stored program contains instructions to energize the actuator to cause the pump to dispense a pre-determined quantity of chemical and to verify that the pump has actually operated to dispense the pre-determined quantity of chemical.

18 Claims, 16 Drawing Sheets

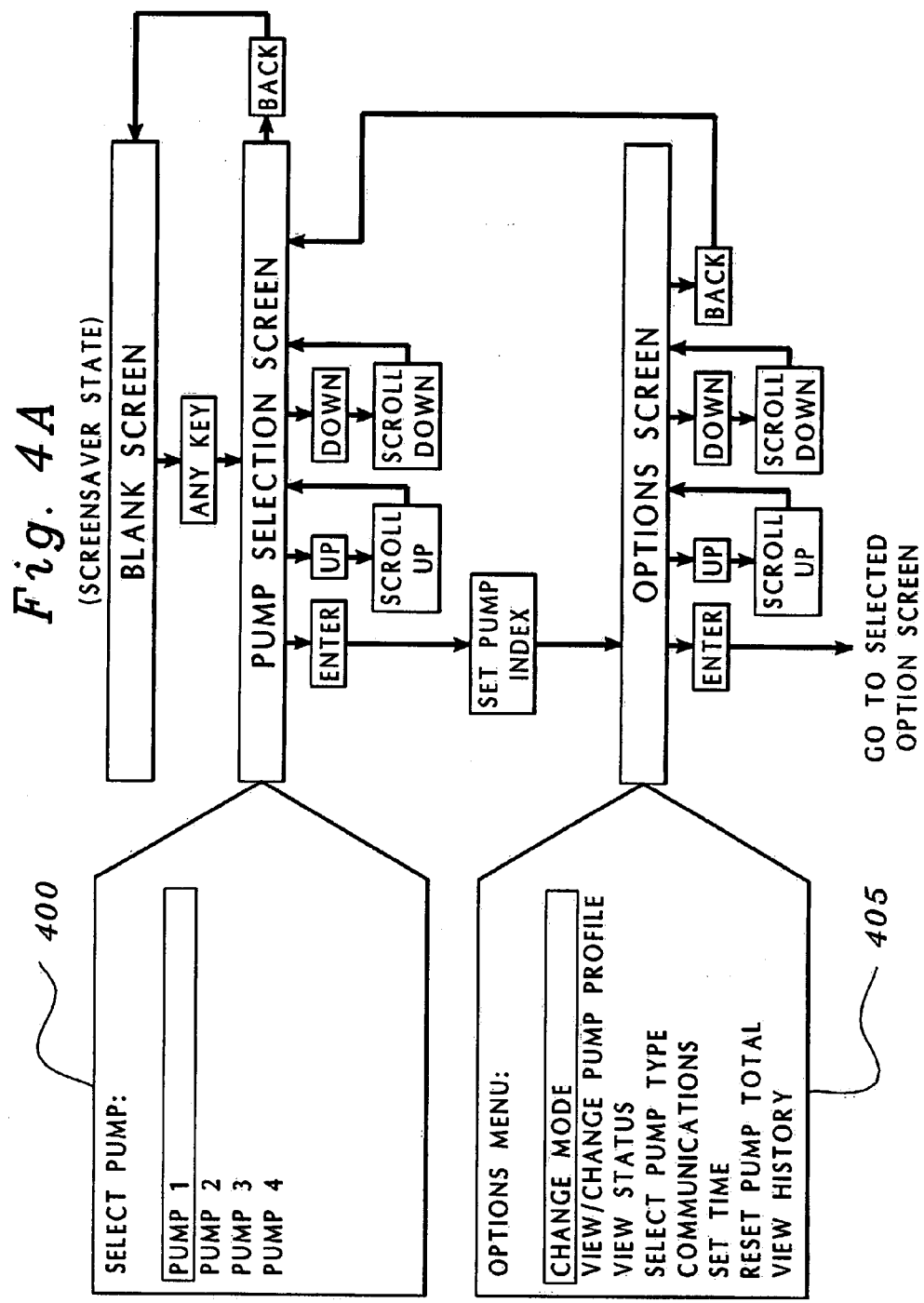

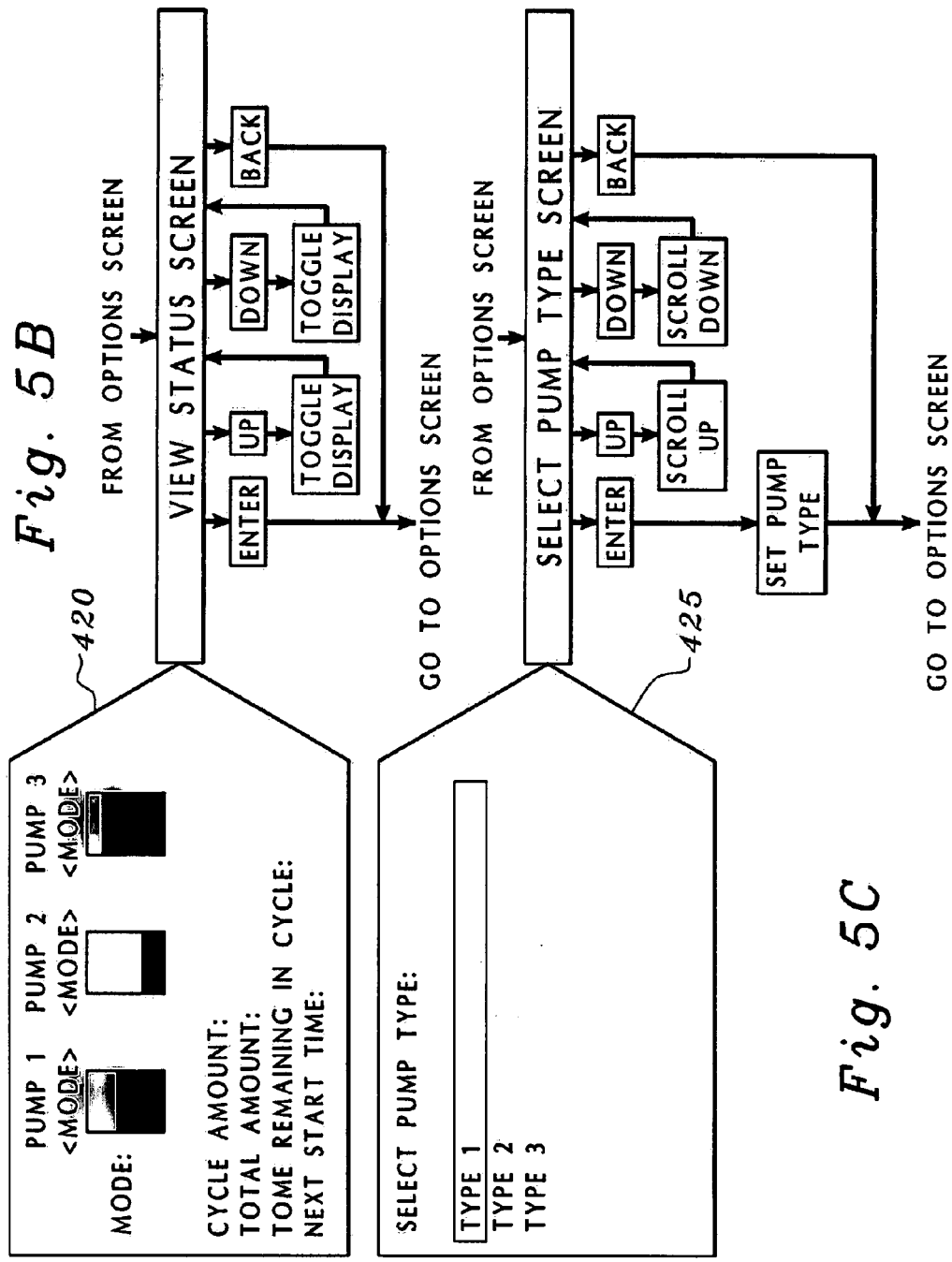

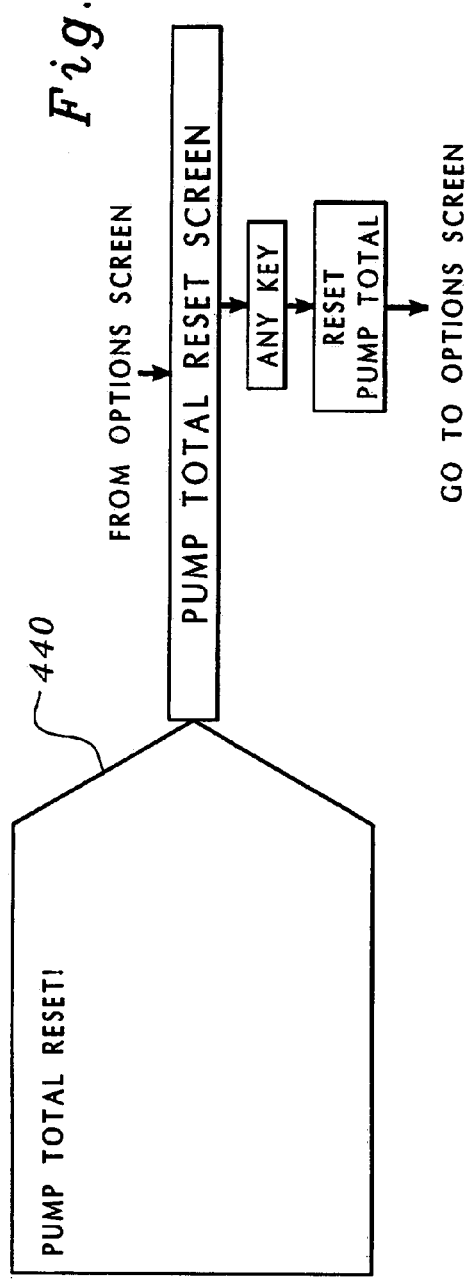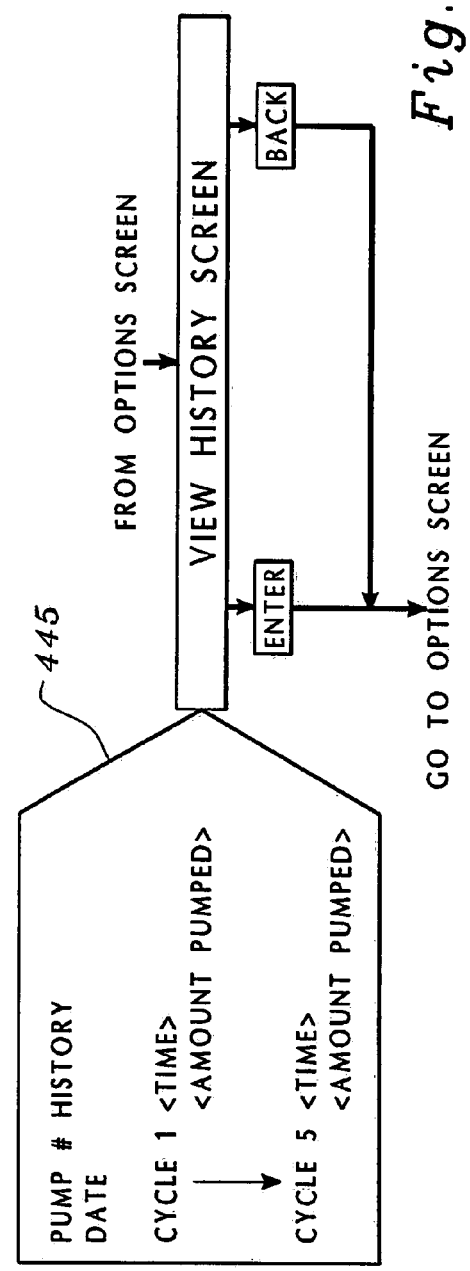

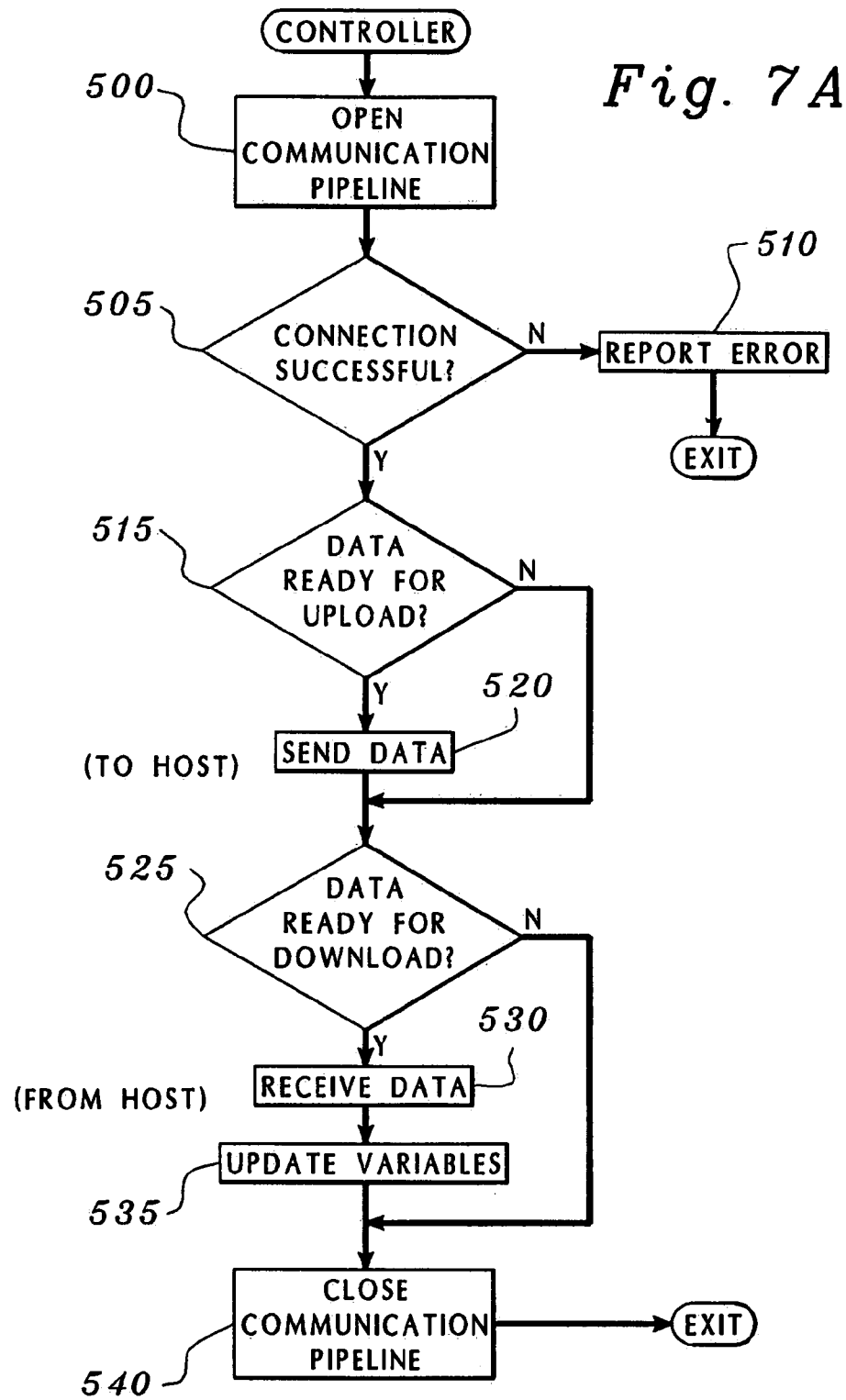

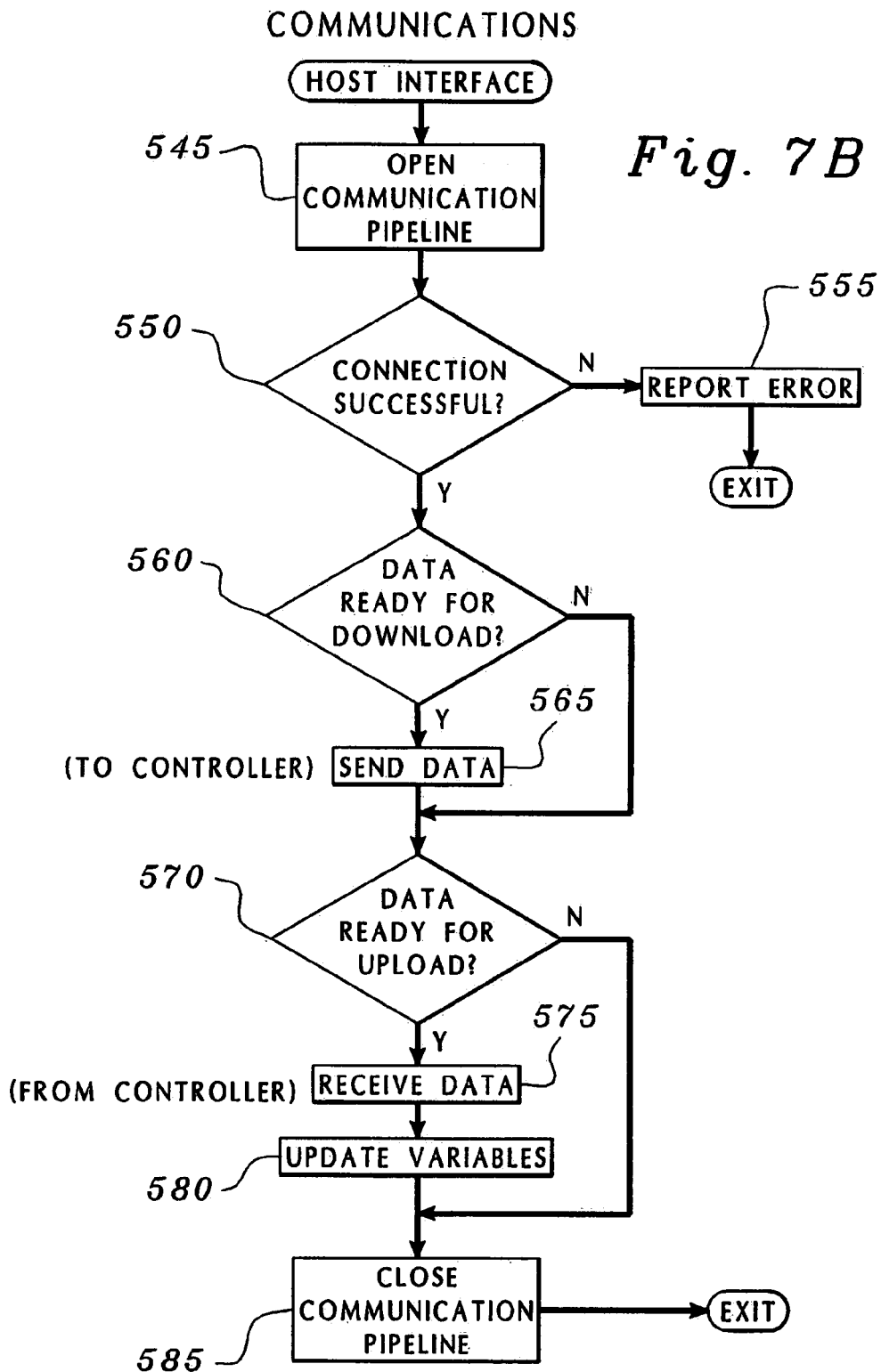

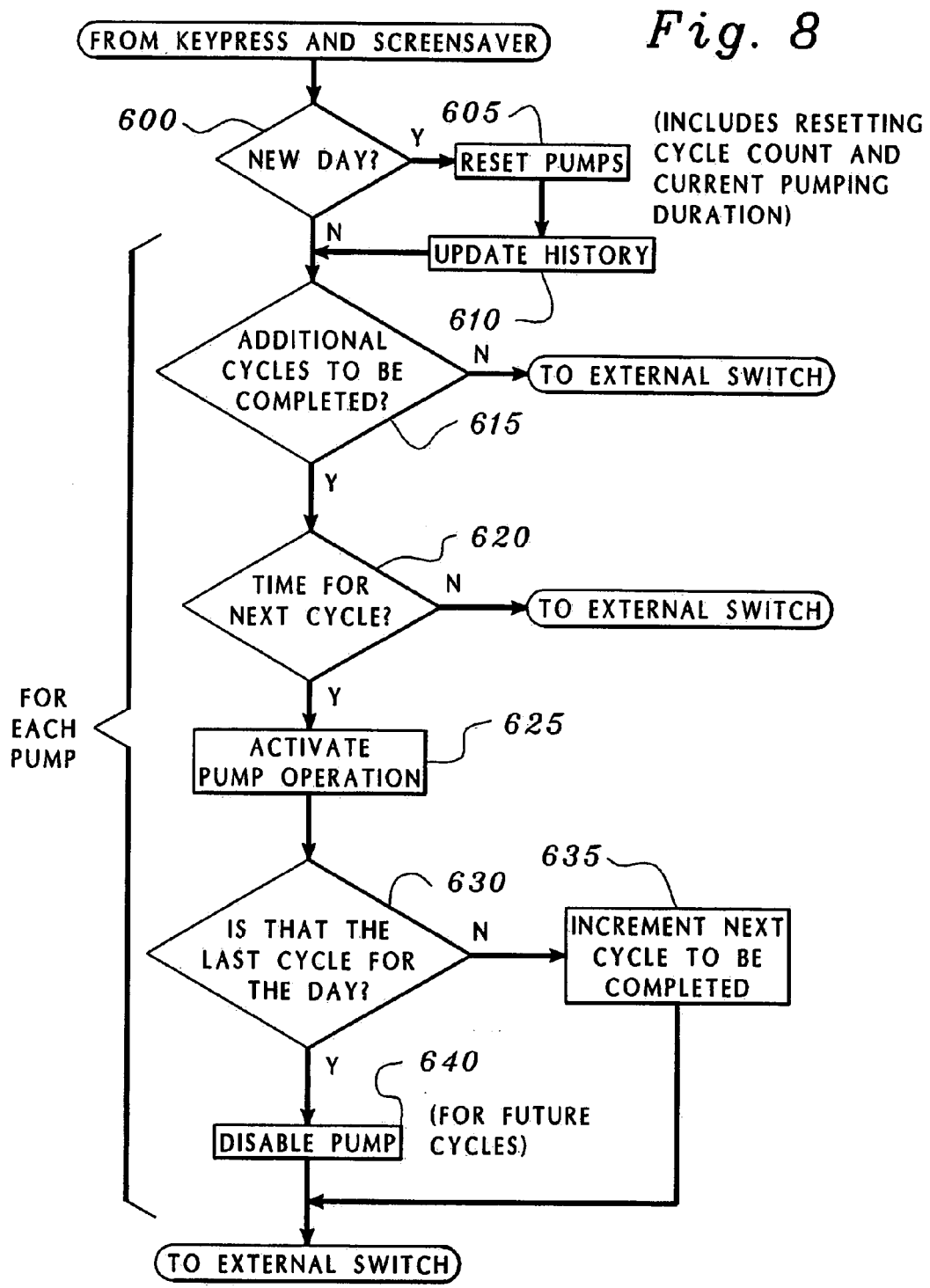

CONTROL SYSTEM AND METHOD FOR CHEMICAL INJECTION

TECHNICAL FIELD

This disclosure relates to the field of chemical injection; in particular, to the automated computer control of chemical injection systems.

BACKGROUND

It is frequently necessary to inject lubricating oils, corrosion inhibitors, and other chemicals into the flow lines and equipment at oil and gas wells and other petroleum facilities. Existing injection systems typically include a pump for injecting a chemical into a system, and some timer, metering valve, or other controller to activate the pump at predetermined intervals. (As used in this application, "chemical" refers to any chemical fluid, including lubricating oils). Because it is important to know the total volume of chemical injected into a fluid system over the period of operation, more sophisticated systems include verification devices to determine the quantity of chemical injected.

Examples include positive-displacement pumps for injecting chemicals into a pipeline, a controller, a flow switch connected to the outlet side of the pump, and an inlet meter for metering the chemical to the pump. The controller typically activates the pump for a predetermined number of strokes. From the number of strokes and a preset pump displacement setting, the purported volume of chemical injected can be calculated. In prior-art systems, the state of the pump is either assumed from the commands sent to it, or else the state is monitored by pressure switches that detect pressure in the line to be charged. The first method does not detect failures at all, and the second method is prone to error because merely moving a valve or pump element can cause spurious pressure changes within a pressurized system.

Such injection systems have advantages and improvements over the prior art techniques and devices, but they provide only coarse chemical usage data. While these systems do provide some quantitative raw data for analysis, adjustment and accountability of the chemical usage, they do not have any capability to present such data in a useful format to facilitate audit or reporting of system operation. The systems are also costly and have to be operated by experienced persons. It would be advantageous to have the injection system controlled centrally from some remote point by appropriately trained and informed persons.

Further complicating the problem is the number of flammable gases that may be present at oil and gas wells, such as mixtures of oxygen, methane, ethane, propane, hydrogen sulfide and others. Similar potentially dangerous environmental conditions exist in locations where petroleum products are being recovered, refined or processed. hazardous environmental conditions may also exist in industrial areas where large quantities of dust are present, such as in grain handling facilities or pulp and paper mil's. Standardized classifications for the various types of hazardous locations have been adopted and assigned by regulatory agencies according to the nature and type of hazard that is generally present or that may occasionally be present.

Because electrical components may generate heat and sparks sufficient to ignite a flammable gas or other flammable mixture under even normal operating conditions, such components must be carefully selected and installed when used in an area that is classified as hazardous. More specifically, the components must exceed certain minimum standards as to such characteristics as power consumption, operating temperature, current and voltage requirements, and energy storage capabilities. These standards are also established by regulatory authorities and vary depending upon the particular hazardous environment.

Certain electrical devices are intrinsically safe. An intrinsically safe device may be generally described as a device that during normal operation, as well as operation during any fault condition, cannot cause a spark or achieve a temperature sufficient to ignite the gas or other substance that is present. If a device is not intrinsically safe, other means must be provided to ensure that the device cannot serve as a source of ignition.

There is thus a need for a chemical injection system that can be centrally controlled, operate automatically, provide and report the accurate dispensing of chemical injections, and also be intrinsically safe in hazardous environments.

SUMMARY

A chemical injection system has a pump and an actuator connected to the pump. The actuator further comprises a first sensor for sensing a deactivated state of the pump; a second sensor for sensing an activated state of the pump; a computer connected to the first and second sensors and the actuator; and an interface connected to the computer, to receive commands from, and to transmit data to, a control point. The computer further comprises a stored program. The stored program contains instructions to energize the actuator to cause the pump to dispense a pre-determined quantity of chemical and to verify that the pump has actually operated to dispense the pre-determined quantity of chemical.

The connection between the computer and the first and second sensors and the actuator is preferably though one or more intrinsically-safe barriers. The interface connected to the computer may be a local control panel, or, the interface connected to the computer may be a communications interface for receiving commands from, and transmitting data to, a control point remote from the pump.

A method for operating a chemical-injection system, comprises providing a controller for the system. The controller communicates with a control point. If the control point is local, the communication is by means of a serial or network protocol, such as the Ethernet protocol; if the control point is remote, the communication is by means of a communications interface. The communications interface can be a cellular telephone link or by satellite radio.

The controller receives commands from the control point (which may be the same physical location); the commands specifying a pump type and a volume of chemical to be injected. The received commands are stored in a memory. The controller computes the number of strokes required to dispense the commanded volume of chemical with the specified pump type. The controller then activates the pump to pump the required volume.

The method can also include receiving commands from the control point further specifying a start time and stop time to dispense a volume of chemical; and, computing the number of strokes of the pump required to pump the commanded volume within the commanded start and stop times.

DRAWINGS

FIGS. 7, 8, 9 and 10 are flow charts showing the execution of the stored program in the controller system of the preferred embodiment.

DESCRIPTION

Figure 1:
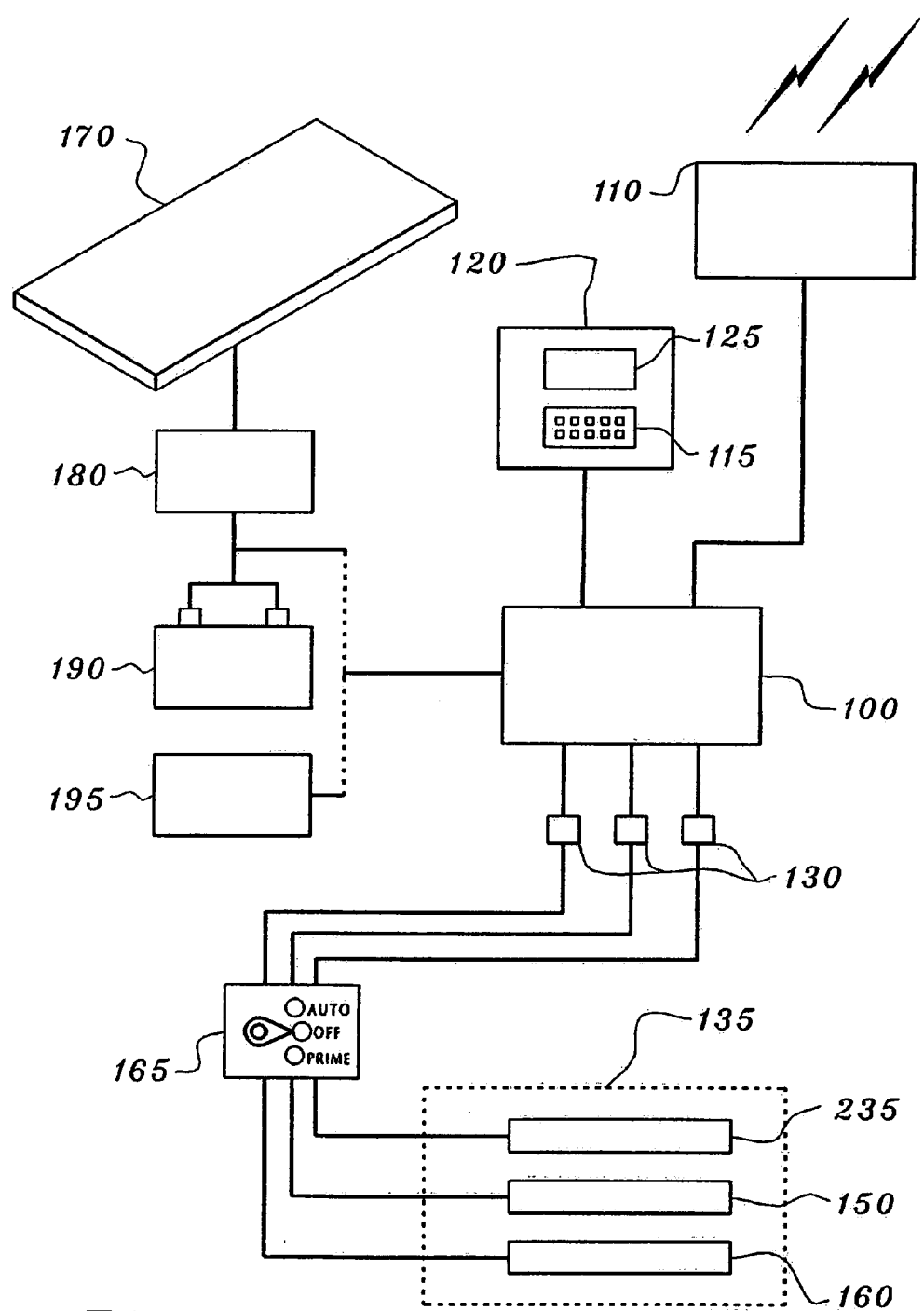
FIG. 1 is a system block diagram of the preferred embodiment.

FIG. 1 is an overall block diagram of the system of the preferred embodiment. A controller (100) is connected through intrinsically-safe electrical barriers (130) to one or more injector pumps (135) (only one is shown in FIG. 1). A suitable intrinsically-safe barrier device is the Model KFD2-8D-EX1.36, manufactured by Pepperl & Fuchs, Inc. of Twinsburg, Ohio. When thus connected through an intrinsically-safe barrier (130), the wiring connection may be called "intrinsically-safe wiring."

Figures 2A, 2B:
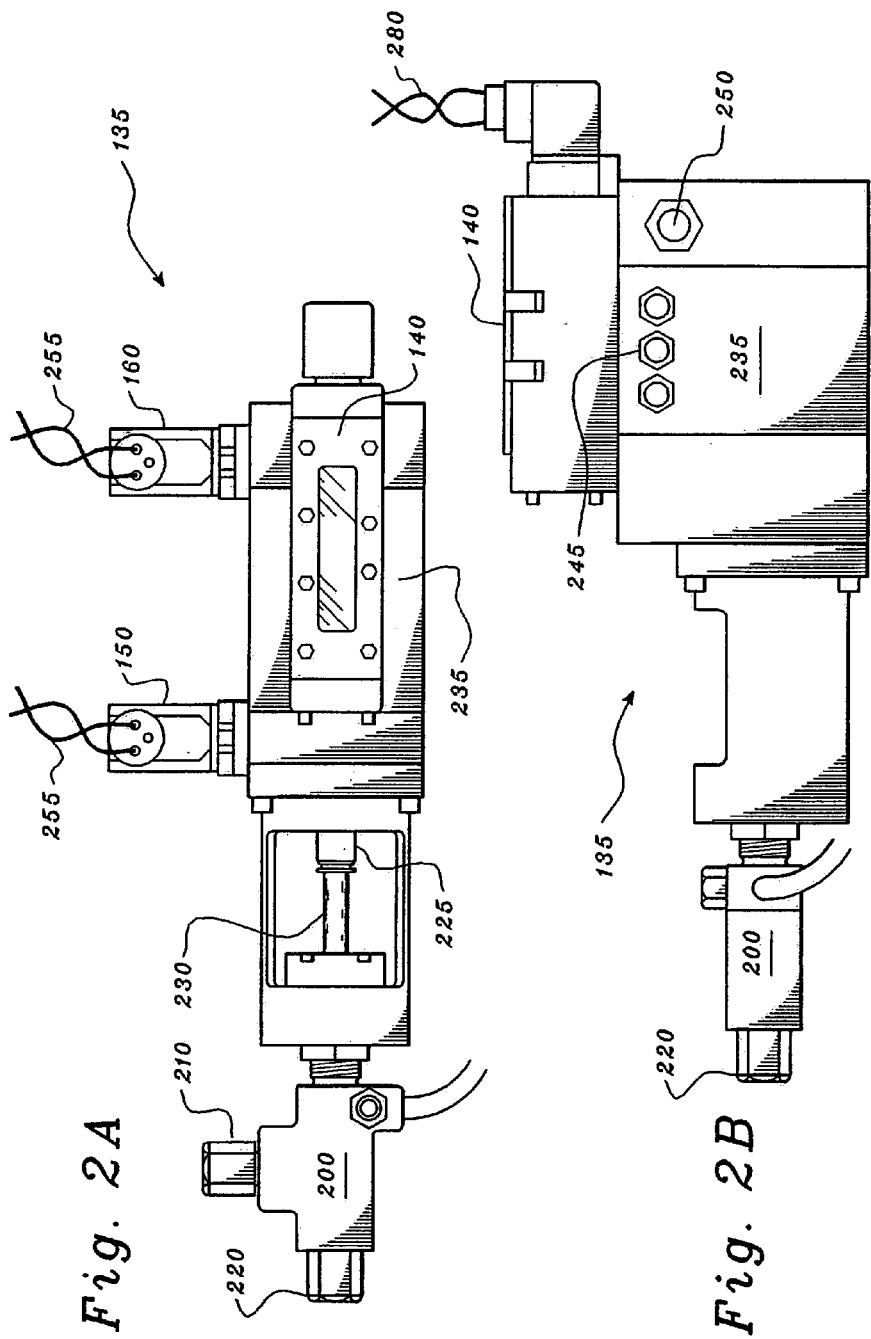
FIG. 2 is shows side and top views of a typical injector pump, linear actuator, solenoid actuator, and position sensors of the preferred embodiment.

A gas-driven actuator (140) is a pilot for a more powerful linear actuator (235) that actually moves a piston rod (225), as shown in FIG. 2. The piston rod (225) is typically connected to a pump rod (230) moving in a bore, thus forming a pump. This type of piston pump is conventionally called the "fluid end" (200).

The linear actuator (235) further has an forward (extension) sensor (150) and a return (retraction) sensor (160), shown schematically in FIG. 1 and in more detail in FIG. 2. A suitable linear actuator (235) is the Burns Injector manufactured by Burns Controls Co. of Dallas, Tex. The forward, or extension, sensor (150) detects the extension of the pump piston rod (225), and the return, or retraction, sensor (160) detects the retraction of the pump piston rod (225), as explained more fully below.

The controller (100) may conveniently take electrical power from a solar panel (170) through a charging controller (180) and a storage battery (190). Alternatively, the controller (100) may take power from a conventional 24-volt DC supply or a 120 or 240-volt AC power source (195).

In the preferred embodiment, the controller (100) may take commands from an operator's control panel (120), located in the field near the controller (100). The details of the control panel (120) are shown below.

The controller (100) is preferably programmed through a connection (105) to either a communications network interface (110), which may be the public telephone network, a cellular telephone system, or a satellite-radio system; or, the controller (100) may be programmed from a local control point, using a serial or network protocol. This host interface (110) is described in more detail below.

FIG. 2 shows a typical injector pump (135) in the preferred embodiment, comprising a pilot actuator (140), a linear actuator (235), a piston rod (225), and a pump rod (230), and the fluid end (200). The injector pump (135) depicted is a conventionally called a "solenoid-driven injector pump," where the linear actuator (235), or "solenoid" is operated by gas or air under pressure. No electrical solenoid may actually be present in the linear actuator (235), although the pilot actuator (140) is typically triggered by an electric solenoid. Of course, other type of pumps could be used, depending on the application, such as electrically-actuated solenoids or electric rotary pumps, and the claims are not limited to injector pumps actuated by gas pressure and having a piston-type fluid-end pump.

In FIG. 2, the fluid end (200) has an inlet (210) and outlet (220) for fluid to be injected. It has a pump rod (230) is driven by a piston rod (225). The piston rod (225) is actuated by a gas or air actuator (140), which is a pilot actuator for a more powerful linear actuator (235) that drives the piston rod (225). The linear actuator (235) has a gas or air supply (245) and exhaust (250). The gas or air actuator (140) opens and closes in response to an electrical signal from the controller (100) through intrinsically-safe wiring (255).

The linear actuator (235) has an forward sensor (150) and return sensor (160), for sensing the position of the piston rod (225) and thus the operating state of the fluid end (200). These sensors may be proximity switches, such as the Model 7F-232583819-SPEC PROBE, manufactured by TopWorx, Inc. of Louisville, Ky. The forward sensor (150) and the return sensor (160) could also be mechanical limit switches, proximity switches, or Hall-effect sensors. The states of the forward sensor (150) and the return sensor (160) are read by the controller (100), as explained below, to detect the state of the pump system (135) after each command from the controller. Intrinsically-safe wiring (280) connects the position sensors (150 and 160) to the controller (100).

In another embodiment, explosion-proof wiring may used instead of intrinsically-safe barriers (130). "Explosion-proof" wiring is defined under the NEMA Code, Sections 7 and 9.

Figure 3:
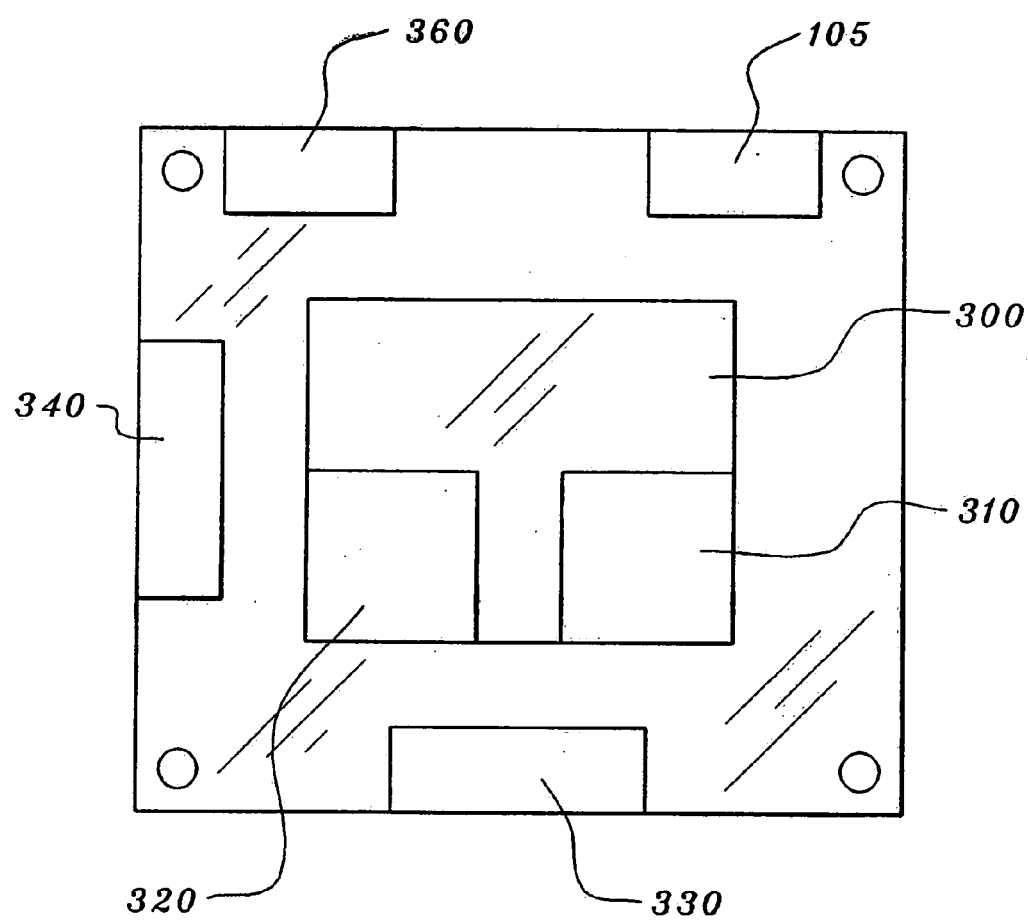
FIG. 3 is a block diagram of the controller sub-system of the preferred embodiment.

FIG. 3 shows a block diagram of a typical electronic board in the controller (100). The controller (100) has a computer that includes a CPU (300), which has random-access memory (RAM) and possibly flash memory (310) and read-only memory (ROM) (320); the latter for holding a stored program. A suitable CPU, memory, and I/O system is the OP7200, manufactured by Z-World, Inc. of Davis, Calif. The CPU (300) and its memories are connected to communications interfaces, these being at least one pump interface (330), a operator panel interface (360), and a communications network interface (110). A power interface (340) accepts and conditions operating power for the controller (100). Each pump system will have a separate pump interface (330) in the controller (100).

The on-board operator panel (120) provides a way for an operator to check status, update timing, and perform manual mode functions on the pumping units connected directly to the controller (100). This is preferably done through a series of menus and keystrokes. A suitable operator interface panel (120) is built into the OP7200 device just mentioned. Or, an independent panel (120) such as the Model 101-0502, manufactured by Z-world, Inc. may be used. Alternatively, the pumps (200) may be operated from a remote control point through a communications interface (110), such as the M2M Portal, provided by SensorLogic, Inc., of Addison, Tex. Communication to the communications interface (110) is preferably accomplished through a serial link to a transceiver included in the communications interface (110) for either terrestrial wireless or satellite-based communication. Preferably the RS-485 serial standard may be used, but other link standards, such as RS-232, Universal Serial Bus (USB) or the IEEE-1394 standard (also known as "Firewire") may be used. In other implementations, communications through a packet network, such as Ethernet or a wireless standard, may be used.

Communications between the communications interface (110) and the remote control point may be handled by cellular telephone links or satellite radio links. A suitable transceiver for a terrestrial network is the GT-48, manufactured by Sony Ericsson Mobile Communications AB. A suitable transceiver for a satellite network is the DMR-200C, manufactured by Skywave Electronics, Inc. of Taipei, Taiwan.

Figure 4B:
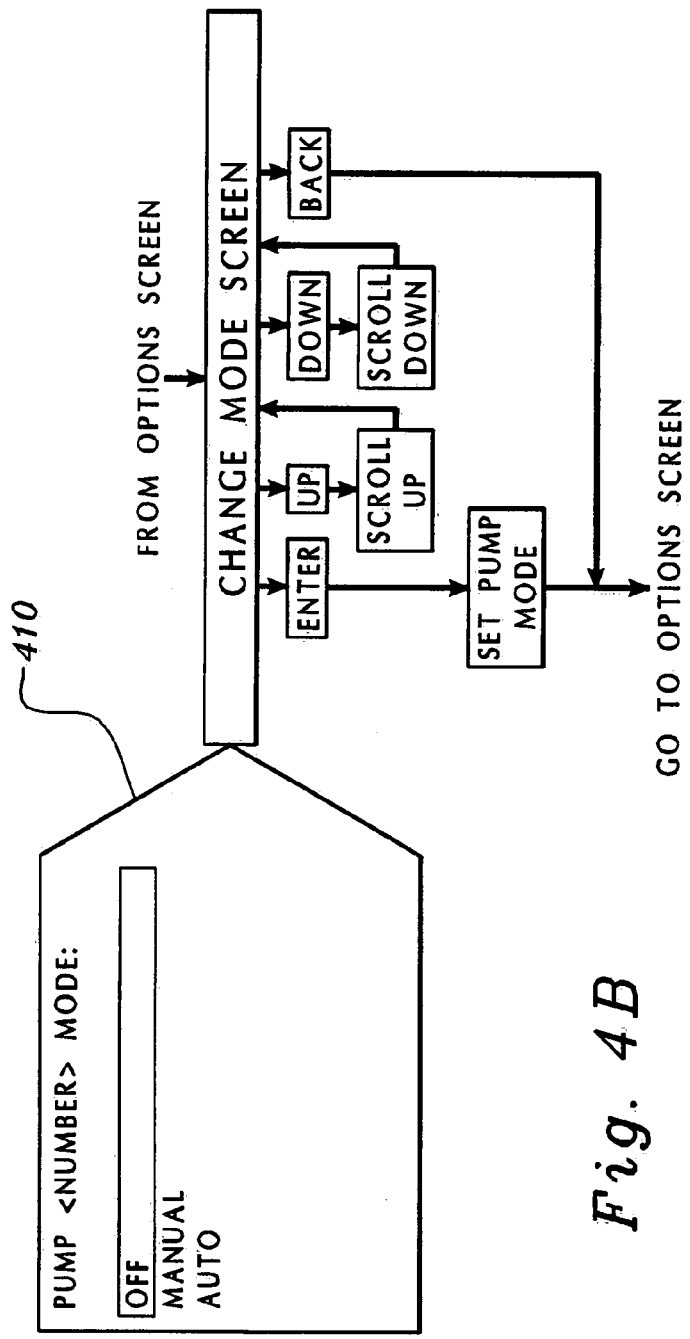
FIGS. 4, 5 and 6 show typical input screens for an operator control panel and the flow of processing for manual input with those screens.
Figure 5A:
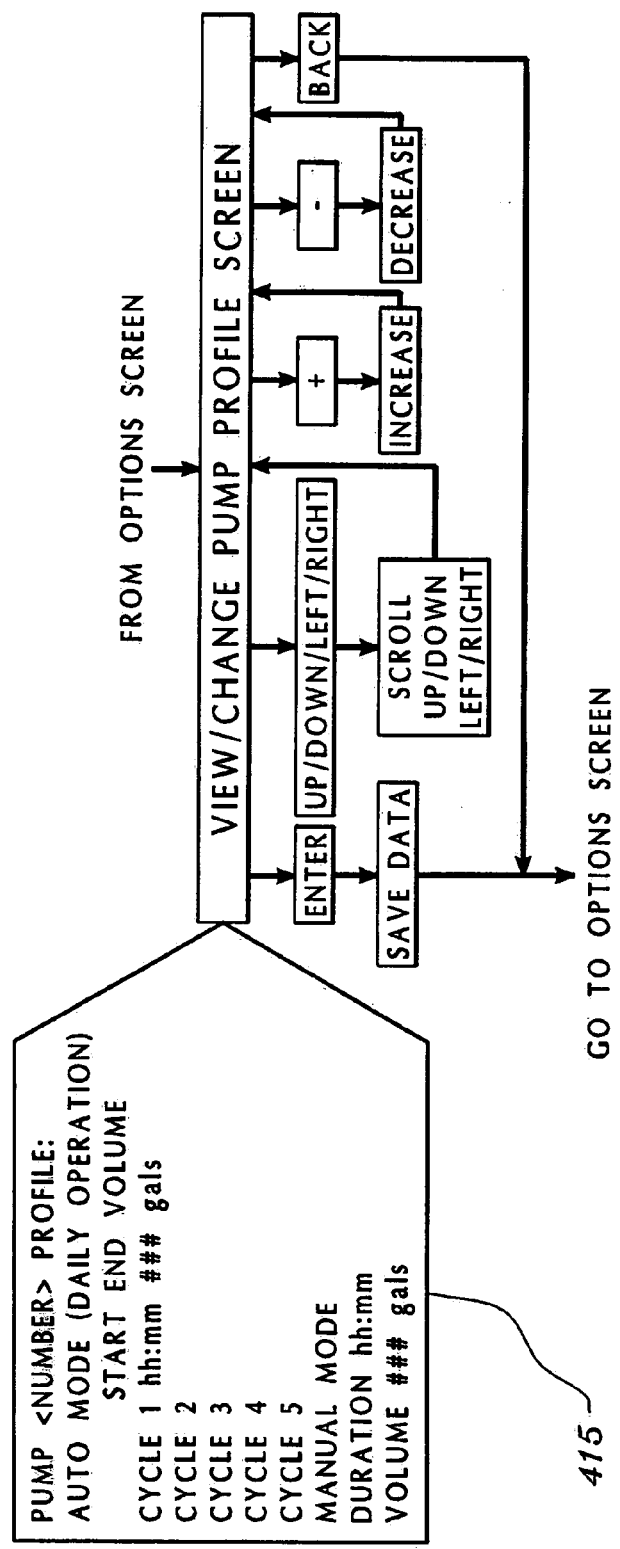
Figure 6A:
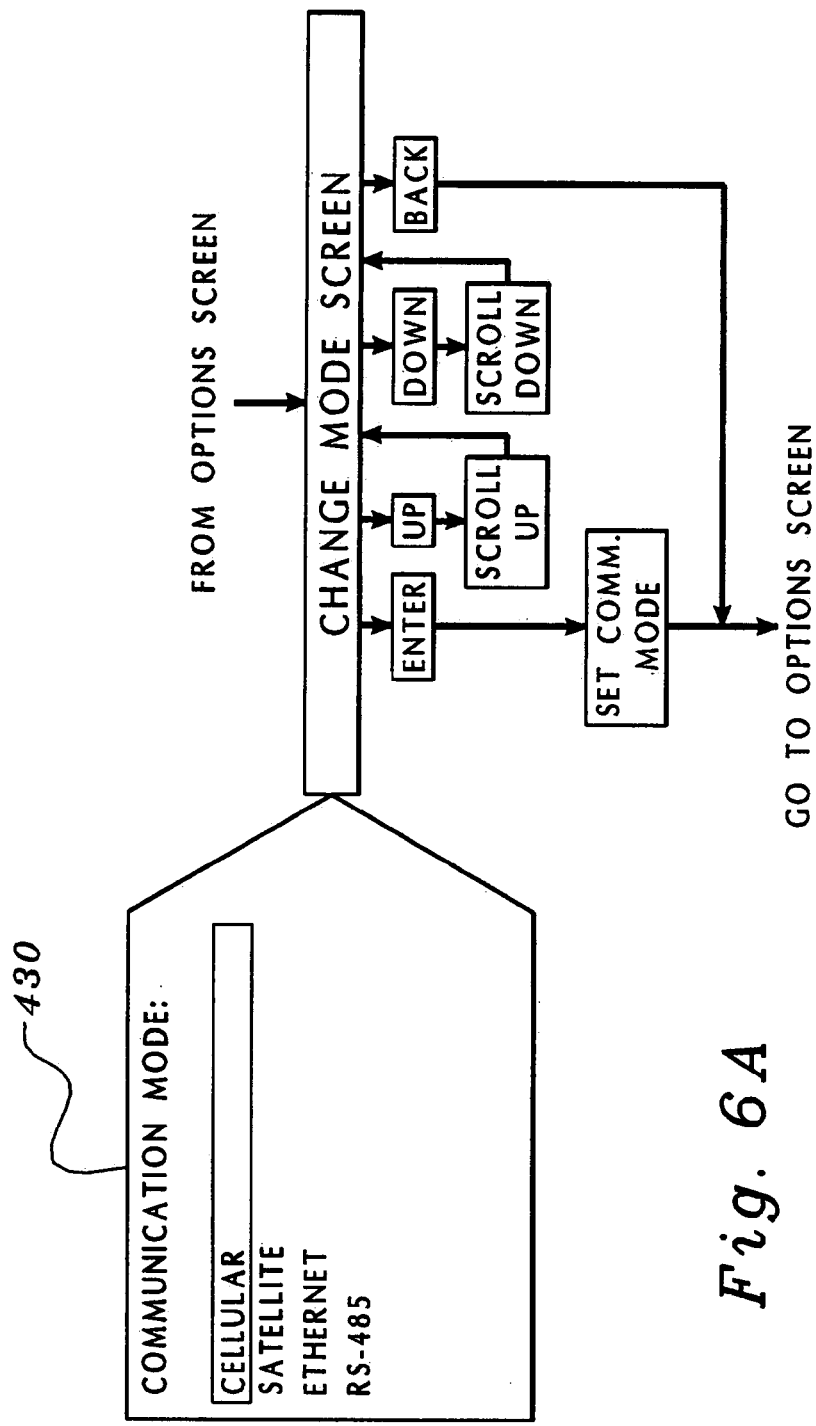
Figure 6B:
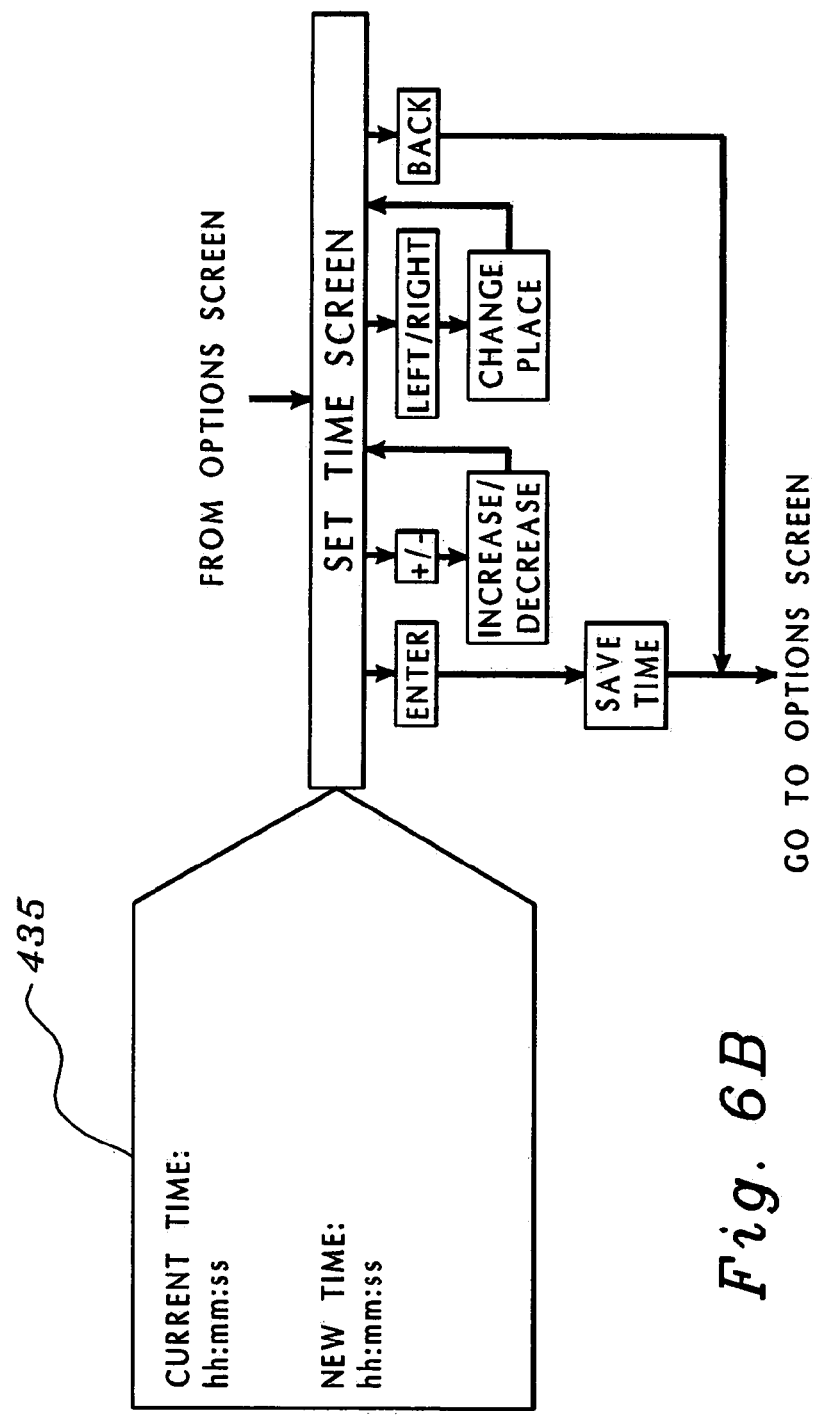

FIGS. 4 through 6 depict typical screens for the operator panel (120). To operate the fluid-end pump (200) locally, the operator uses the keypad (115) and display (125) mounted within the panel (120). The operator first selects which injector pump (135) to operate at a first display (400), and then selects at an options menu (405) whether to change the mode of the pump (off, automatic or manual), view or change the pump profile, view the pump status, select a pump type change communications parameters, set the time of day, reset the pump total, or view a history of the pump's operation.

The change-mode screen (410) allows the user to turn the pump off, select manual operation, or select automatic operation, the latter being the normal operating mode. The manual-operation mode allows the user to deactivate the injector pump (135) for an interval of time and prime the fluid end (200). When the injector pump (135) is manually deactivated, it will not operate until the time interval expires or until the user cancels the override.

The pump-profile menu (415) allows the user to configure pumping start times, durations and volumes. Each injector pump (135) may be instructed to pump at a specific time each day, on a specific interval, or immediately. Preferably, the system detects when the user has specified a volume that cannot be pumped by a given pump in the cycle time interval specified, and prompt the user to re-enter an appropriate value.

Selecting the view-status menu (420) enables the on-site user to view the results of the latest pump cycle (including success or failure and volume pumped) and the total pumped since the total was reset.

The select pump type menu (425) allows the user to set up the operation of a specific type of pump. The "pump type" selects a particular pump type having a particular volume from a data structure of the necessary parameters, for use by the stored program in the procedures that operate the pumps (135).

The menu screen for the communications mode (430) allows selection of the communications mode from the controller (100) to the remote or local control point. These could be, for example, cellular telephone, satellite communications, an Ethernet network, or an RS-485 serial connection, depending on the distance to the remote control point and the requirements of particular installations.

The set-time menu screen (435) allows set-up of the time of day. This value will be necessary to compute the start and stop times of the pumping operations.

A menu screen to reset the pump total figure (440) is also provided.

The pump history menu screen (445) allows the user to view the pumping history of a selected pump.

The screens shown in FIGS. 4, 5, and 6 are illustrative only, and other screen designs for the display of parameters and the input of information could be used.

By way of example, the following behaviors could be set for the pump system:

every day, pump X gallons over Y hours starting at Z o'clock;

starting now, pump X gallons over Y hours;

where W, X, Y and Z are parameters set by the operator.

Initialization of the pump system would typically include the following:

a setup and priming cycle is run;

injection drive cylinder is in the back position (pump solenoid deactivated):

rear position sensor is actuated;

forward position sensor is not actuated;

fluid-end pump volume per stroke is set;

start and or interval time is set;

cycle duration time is set;

system is enabled.

(A typical priming operation on setup would be five minutes at 20 strokes per minute.)

The following figures are flowcharts of the software processes in the preferred embodiment. Those skilled in software development could use different processes to achieve the same results as those claimed.

Figure 9A:
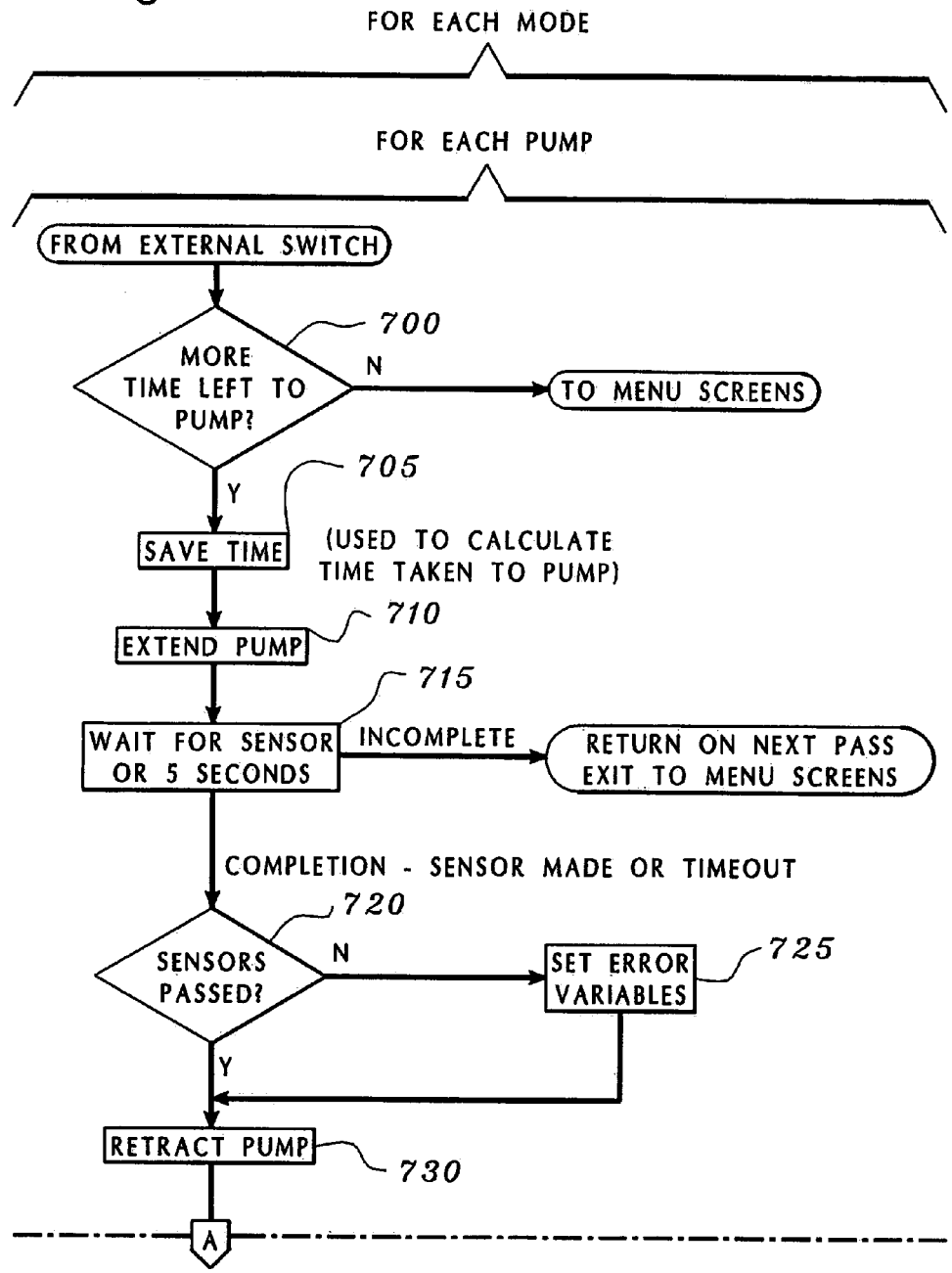
Figure 9B:
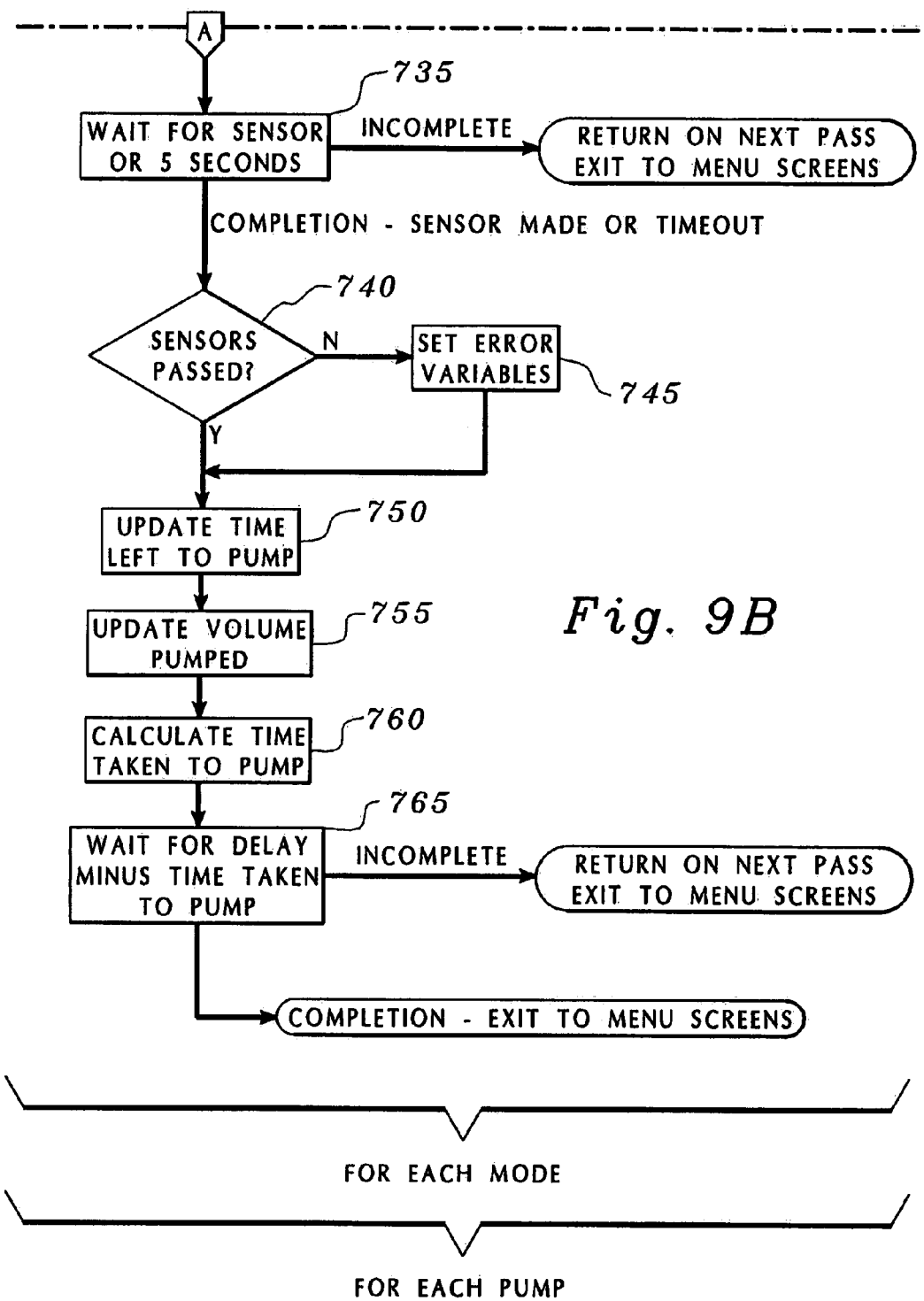

After the system powers on and initializes, execution passes to at least four concurrent processes, these being operator entry (FIGS. 4A and 4B, discussed above), communications (FIGS. 7A and 7B), pump assignments supervision (FIG. 8), and pump operations (FIG. 9).

FIG. 7A shows the flow of execution for the communications processes for communication between the controller (100) and the host interface (110) initiated by the controller (100). At step 500, the process opens the communications pipe line. Step 505 checks to see if the connection was successful. If not, the error is reported at step 510; else, the process checks for data ready to upload to the host (110) at step 515. If no data is ready for upload, execution proceeds to step 525 to check for data ready to download from the host (110) to the controller (100). Otherwise, the data ready to upload is sent to the host at step 520. If no data is ready to download, execution proceeds to step 540. If data is ready to download from the host (110), the data is received at step 530, and at step 535, the process updates the stored variables affected by the download. The communications pipeline is closed at step 540 and execution proceeds to the next process in the task list.

FIG. 5B shows the flow of execution for the communications processes for communication between the host interface (110) and the controller (100) initiated by the host interface (110). At step 545, the process opens the communications pipe line. Step 550 checks to see if the connection was successful. If not, the error is reported at step 555; else, the process checks for data ready to download to the controller (100) from the host (110) at step 560. If no data is ready for download, execution proceeds to step 570 to check for data ready to upload from the controller (100) to the host (110). Otherwise, the data ready to download from the host (110) is sent to the controller (100) at step 565. If data is ready to download from the controller (100) to the host (110), the data is sent and received by the host (110) at step 575, and, at step 580, the process updates the stored variables affected by the download, if any. The communications pipeline is closed at step 585 and execution proceeds to the next process in the task list.

FIG. 8 shows the process for supervising the pump assignments in the preferred embodiment. At step 600, the process checks the system clock to determine if a new day has begun. If so, the pump daily cycle count and pumping duration are reset at step 605 for the new day, and the pump history record is updated at step 610 to reflect the change of the day. Otherwise, the process goes to step 615 the see if any additional cycles are to be completed in the current day. If so, the program at step 620 checks to see if the scheduled time for the next pump cycle has arrived. If so, pump is activated at step 625. Step 630 checks to see if this is the last cycle for that day. If not the cycle count is incremented at step 635. If it is the last cycle for the day, step 640 disables the pump for future cycles in that day. The process just described executes for each pump connected to the controller.

FIG. 9 shows the flow of execution in the pump operation process in the preferred embodiment. At step 700, the process checks to see if more time is left to pump for this pump. If so, the current clock time is saved at step 705. The pump rod (230) is extended at step 710, that is, it expels fluid from the fluid-end pump (200). Step 715 waits for the pump forward sensor (150) to report extension of the pump rod (230), or a maximum of five seconds in this implementation. If no sensor report is received within this time, the program sets an error variable and proceeds. The sensor will be checked the next time this process executes.

If extension of the forward sensor (150) is sensed at step 720, step 730 orders the pump rod (230) to retract. If extension of the forward sensor is not sensed at step 720, step 725 reports an error. After retraction of the pump rod (230) is ordered at step 730, step 735 waits for the pump return sensor (160) to report return of the pump rod (230), or a maximum of five seconds, in this implementation. If no sensor report is received within this time, the process exits to check for entry in the menu screens. If return of the sensor (160) is not sensed at step 7740, step 745 reports an error. Then the time left to pump is updated at step 750 and the volume of fluid pumped is updated at step 755.

Step 760 calculates the total time taken for the current pumping operation. Step 765 waits for a predetermined delay time, less the time just taken to pump.

The steps just described and shown in FIG. 8 are executed for each pump in each mode (off, manual, or automatic).

Figure 10:
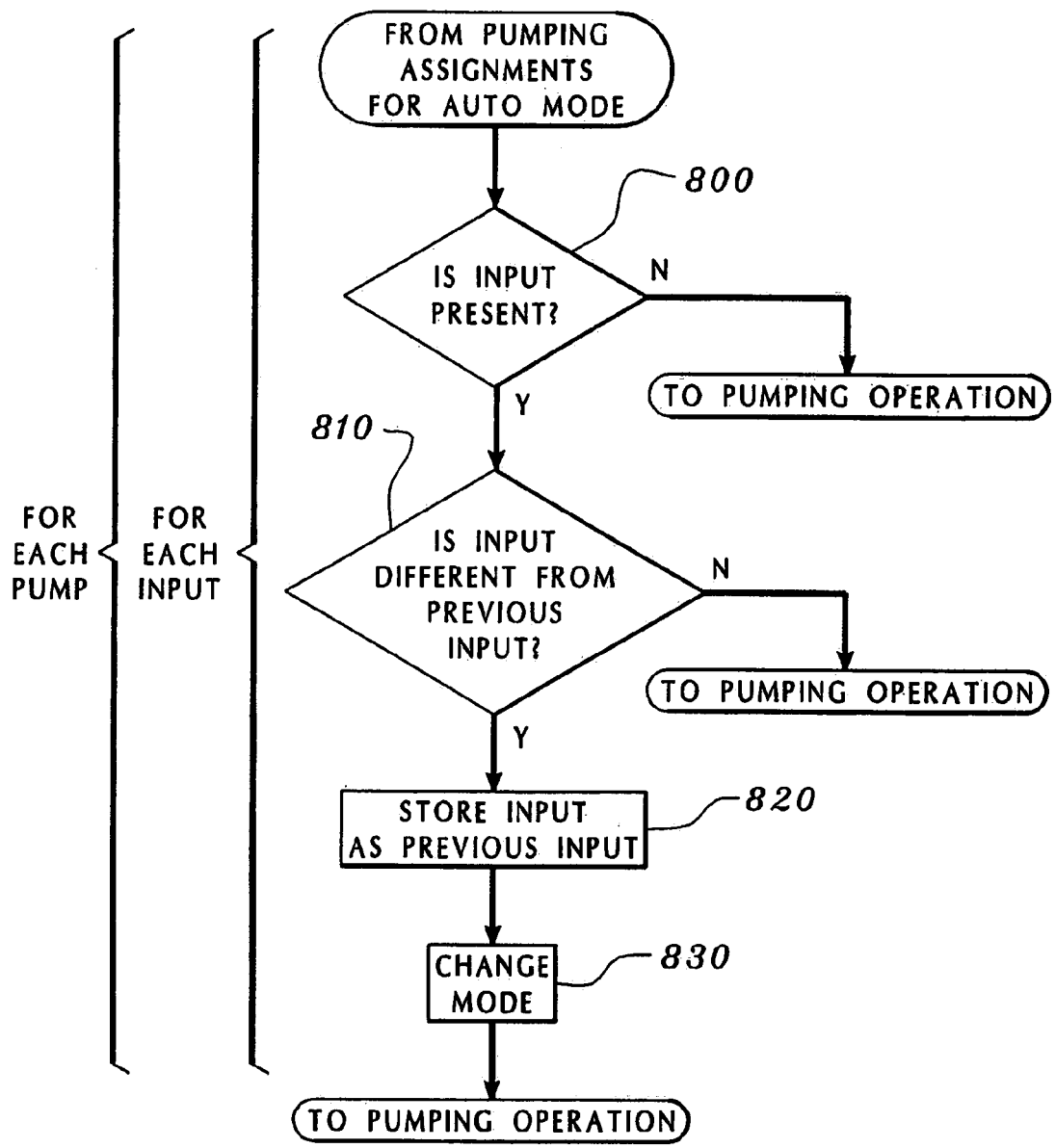

FIG. 10 shows a process for an external switch (165) that may be useful in some embodiments. For instance, if a workman wanted to turn off pump operation temporarily, but the control panel was some inconvenient distance from the pump location, or for maintenance or safety reasons, he could turn off pump operation at a simple input panel at the pump. Here the process checks for input present at step 800. If none is present, execution returns to the pumping operation. If the input is not difference from the previous input (that is, no change) at step 810, execution also returns to the pumping operation. If the input is different, step 820 stores the input as the "previous input" and at step 830 changes the mode of the pump to "off."

Since those skilled in the art can modify the specific embodiments described above, we intend that the claims be interpreted to cover such modifications and equivalents.

We claim:

1. A chemical injection system comprising:
   a pump;
   an actuator connected to the pump; the actuator further comprising:
      a first sensor for sensing a deactivated state of the pump;
      a second sensor for sensing an activated state of the pump;
   a computer connected to the first and second sensors and the actuator;
   an interface connected to the computer, to receive commands from, and to transmit data to, a control point; the computer further comprising:
      a stored program; the stored program containing instructions to:
         energize the actuator to cause the pump to dispense a pre-determined quantity of chemical; and,
         verify that the pump has actually operated to dispense the pre-determined quantity of chemical.

2. The system of claim 1 where the connection between the computer and the first and second sensors and the actuator is though one or more intrinsically-safe barriers.

3. The system of claim 1 where the connection between the computer and the first and second sensors and the actuator is through explosion-proof wiring.

4. The system of claim 1 where the interface connected to the computer is a local control panel.

5. The system of claim 1 where the interface connected to the computer is a communications interface for receiving commands from, and transmitting data to, a remote control point.

6. The system of claim 5 where the communications interface further includes a satellite radio transceiver for receiving commands from, and transmitting data to, a remote control point.

7. The system of claim 5 where the communications interface further includes a cellular-telephone transceiver for receiving commands from, and transmitting data to, a remote control point.

8. The system of claim 1 where the stored program further contains instructions to receive commands for the pump from the interface and to send messages concerning the state of the pump to the interface.

9. The system of claim 1 where the stored program further includes instructions to calculate a required number of pump strokes to cause the pump to dispense a pre-determined volume of the chemical.

10. The system of claim 1 where the process of verifying that the pump has actually operated to dispense the pre-determined quantity of chemical further comprises:
    the pump having a piston rod;
    the first sensor located so as to actuate when the piston rod is returned;
    the second sensor located so as to actuate when the piston rod is forward;
    the stored program further containing instructions to:
       command the piston rod to extend;
          transmit to the interface an error message if the piston rod is not extended forward after a pre-determined time;
       command the piston rod to retract; and,
          transmit to the interface an error message if the piston rod is not retracted to its return position after a pre-determined time.

11. A method for operating a chemical-injection system, comprising:
    providing a controller; the controller communicating with a control point;
    receiving commands from the control point; the commands specifying a pump type and a volume of chemical to be injected;
    storing the received commands in a memory;
    computing the number of strokes required to dispense the commanded volume of chemical with the specified pump; and,
    activating the pump to pump the commanded volume.

12. The method of claim 11 further comprising:
    receiving commands from the control point further specifying a start time and stop time to dispense a volume of chemical; and,
    computing the number of strokes of the pump required to pump the commanded volume within the commanded start and stop times.

13. The method of claim 11 further comprising:
    receiving commands from the control point that specify more than one cycle of volumes to be pumped and start and stop times for pumping;

for each specified cycle:
computing the number of strokes required to dispense the commanded volume of chemical with the specified pump; and,
activating the pump to pump the commanded volume.

14. The method of claim 11, where the control point is a local control point.

15. The method of claim 11, where the control point is a remote control point.

16. The method of claim 15, further providing a cellular telephone communications interface connected to the controller for communicating with the remote control point.

17. The method of claim 15, further providing a satellite radio communications interface connected to the controller for communicating with the remote control point.

18. A method for operating a chemical-injection system, comprising:
providing a controller; the controller communicating with a control point;
receiving commands from the control point; the commands specifying a pump type and a volume of chemical to be injected;
storing the received commands in a memory;
computing the number of strokes required to dispense the commanded volume of chemical with the specified pump;
activating the pump to pump the commanded volume; and,
verifying that the pump has actually operated to dispense the commanded volume of chemical.

* * * * *